United States Patent
Nelson et al.

(10) Patent No.: US 6,948,861 B2
(45) Date of Patent: Sep. 27, 2005

(54) HEAT SINK FOR AN OPTICAL MODULE

(75) Inventors: Eric Nelson, Boca Raton, FL (US); Guy A. Cole, Boca Raton, FL (US); Babak B. Makooi, Boca Raton, FL (US); Albrecht Neidecler, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 639 days.

(21) Appl. No.: 09/921,410

(22) Filed: Aug. 1, 2001

(65) Prior Publication Data

US 2003/0026555 A1 Feb. 6, 2003

(51) Int. Cl.[7] ............................................. G02B 6/36
(52) U.S. Cl. ......................................................... 385/92
(58) Field of Search ............................... 385/90–92, 49, 385/88, 89

(56) References Cited

U.S. PATENT DOCUMENTS

| | | | |
|---|---|---|---|
| 4,691,987 A | 9/1987 | Ebner et al. ............ 350/96.23 |
| 4,763,225 A | 8/1988 | Frenkel et al. ............... 361/388 |
| 5,852,257 A | 12/1998 | Dittman et al. ................ 174/59 |
| 6,132,104 A | * 10/2000 | Bliss et al. .................... 385/53 |
| 6,164,837 A | * 12/2000 | Haake et al. .................. 385/90 |
| 6,172,997 B1 | * 1/2001 | Miyake et al. ................ 372/36 |

* cited by examiner

Primary Examiner—Khiem Nguyen

(57) ABSTRACT

An optical module includes a base and a plurality of cooling fins mounted to the back surface of a printed wiring board used to support a number of opto-electronic devices. To optimize heat removal; the fins are mounted on the back surface in alignment with the opto-electronic devices mounted on the front surface. The module also includes a number of fiber-optic management features which are mounted on the wiring board or materially integrated with the base and cooling fins. By combining fiber-optic management features with a heat sink, on the opposite side of board-mounted opto-electronic components, the optical module achieves increased packaging density and functionality on a per volume basis compared with its conventional counterparts.

20 Claims, 2 Drawing Sheets

HEAT SINK FOR AN OPTICAL MODULE

BACKGROUND OF THE INVENTION

1. Field of the Invention

This invention generally relates to an optical module for transmitting and receiving optical signals in a fiber-optic communications system, and more particularly to a heat sink assembly for removing heat from an optical module on which opto-electronic and/or electronic components are mounted.

2. Description of the Related Art

Optical modules come in a variety of shapes and sizes but all of them share at least one common feature: they contain opto-electronic components which generate heat that could adversely affect performance. In conventional modules, heat sinks are add-on features which increase the height of the module, its overall surface area, or both. This is a significant drawback because the increased size compromises the packaging density within the optical module and reduces system functionality on a per volume basis. It is therefore apparent that there is a need for an improved optical module heat sink that does not increase the effective size of the module and at the same time increases its functionality. This increased functionality desirably includes the integration of the heat sink with other components on the optical module.

SUMMARY OF THE INVENTION

It is an object of the present invention to provide an improved optical module having a heat sink that dissipates thermal energy more effectively compared with conventional structures of this type, and the same time does not increase the overall size of the module.

It is an object of the present invention to provide an optical module of the aforementioned type which has a higher packaging density and increased functionality compared with conventional modules.

It is another object of the present invention to provide an optical module which combines one or more fiber-optic management features with a heat sink on the same mounting plane, thereby increasing the overall packaging density of the module while simultaneously increasing its functionality on a per-volume basis.

It is another object of the present invention to provide an optical module of the aforementioned type which includes an area on which electrical components may be mounted, thereby further increasing packaging density.

It is another object of the present invention to provide an optical module of the aforementioned type wherein the mounting structure is formed from a single casting.

The foregoing and other objects of the invention are achieved by providing an optical module which includes a mounting plane attached to a heat sink. The mounting plane preferably includes a printed wiring board having a first area on which a number of opto-electronic devices are mounted, and an optional but desirable second area on which a number of electronic components are mounted. The heat sink includes a plurality of cooling fins attached to a surface of the wiring board opposite to where the opto-electronic and electronic components are mounted. The wiring board may be a mother board, circuit card, or any other structure where opto-electronic or electronic components are mounted. To enhance the thermal removal properties of the module, the heat sink may be constructed to include a surface of thermally conductive material adjacent the same surface on which the components are mounted. Preferably, this surface and the cooling fins are integrally formed to have a one-piece construction.

In addition to these features, the optical module includes a number of fiber-optic management features which are either mounted onto one or both surfaces of the mounting plane or integrated directly into the heat sink. In the former case, the management features include optical fiber couplers and splitters to name a few, and in the latter case the management features include one or more winding structures on which excess optical fiber may be stored should the module need repair. According to one aspect of the invention, the winding structures have different radial dimensions and are formed integrally with the heat sink, e.g., as an extension of the material from which the heat sink is made and in the same casting.

By combining fiber-optic management features with a heat sink as described above, the optical module of the present invention has increased packaging density and functionality per volume compared with conventional modules, and this density and functionality is enhanced by including electronic components on the mounting plane. As a result, the invention solves the long-standing problem of what those skilled in the art of optical-module packaging have referred to as "fitting ten pounds in a five pound sack," because through the invention the volume of the module is effectively reduced while functionality is increased. The invention may also lower costs for the manufacturer by combining fiber-optic management features and the heat sink into the same casting. Improved thermal performance may also be realized because the low-profile fin structure of the heat sink does not block air flow from passing over adjacent modules when, for example, the module is included in a sub-rack assembly. With these advantages, the optical module of the present invention is ideally suited for use in the telecommunications and optical networking industries, or any other application where fiber optics are used.

DESCRIPTION OF THE PREFERRED EMBODIMENTS

Figure 1:
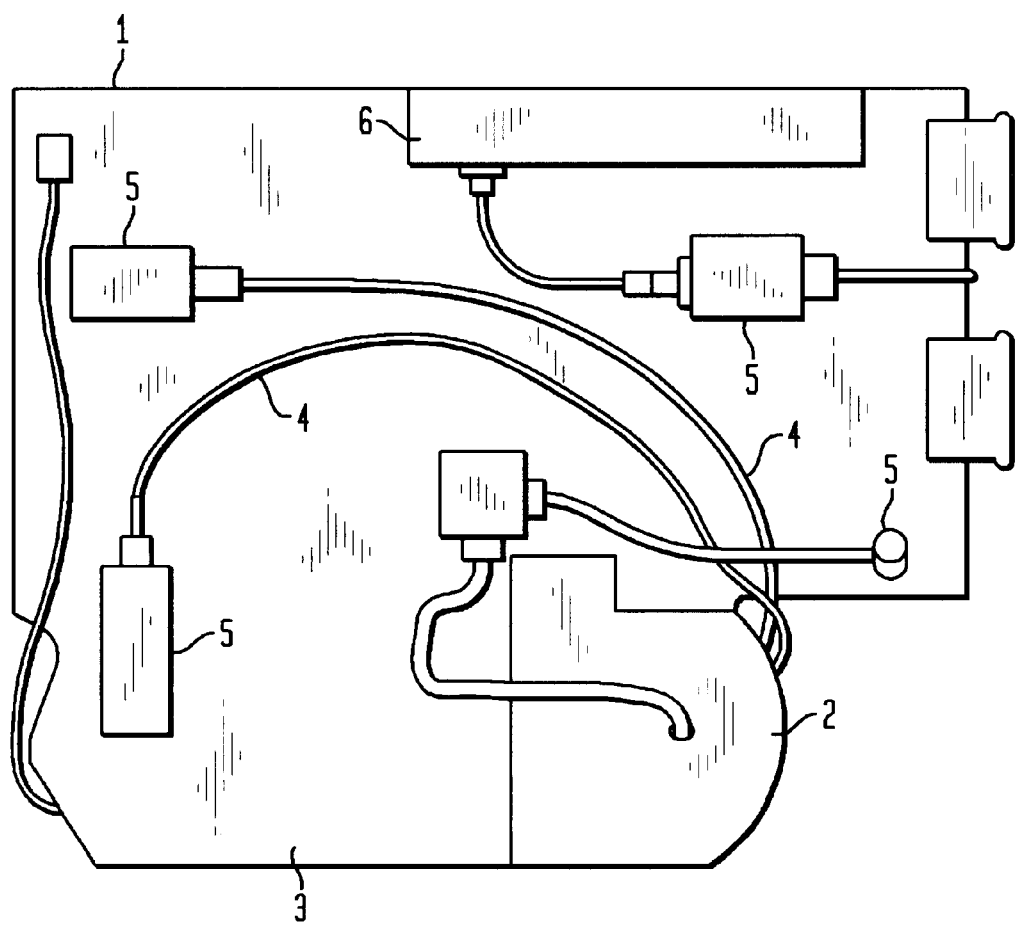
FIG. 1 is a diagram showing a top surface of the optical module in accordance with a preferred embodiment of the present invention.

FIG. 1 shows a front surface of an optical module 1 in accordance with a preferred embodiment of the present invention. The optical module includes a first heat sink in the form of a heat sink surface 2 and a fiber routing platform 3 on which are mounted one or more optical fibers 4 and opto-electronic components 5, e.g., fiber-optic cable connectors, lasers, monitor diodes, receivers, modulators, and modulator drivers. The fiber routing platform may be a printed wiring board and the heat sink surface is made from a thermally conductive material such as aluminum, magnesium, copper, and alloys thereof. A composite material of, for example, graphite may also be used for the heat sink. If desired, a number of electrical components 6 may be mounted to the fiber routing platform to increase the functionality of the module. In operation, heat from the opto-electronic and optical components conduct through the printed wiring board to the heat sink surface where it is rapidly dissipated.

Figure 2:
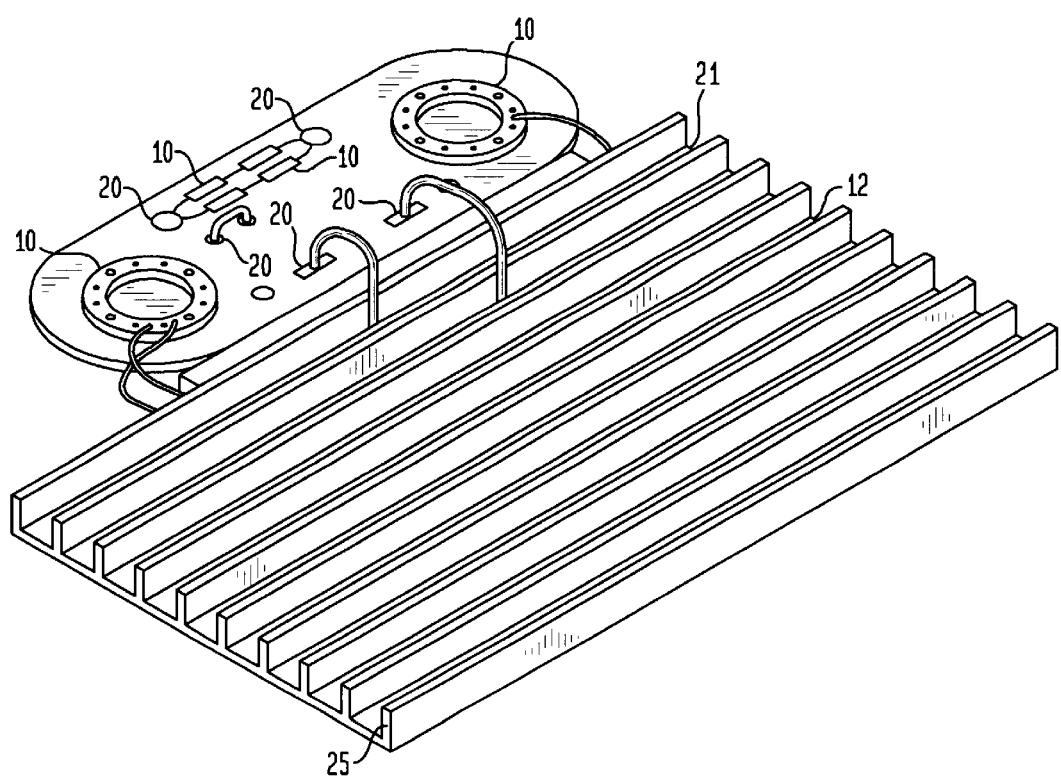
FIG. 2 is a diagram showing a bottom surface of the optical module in accordance with a preferred embodiment of the present invention.

FIG. 2 shows a back surface of the optical module of the invention which includes a number of fiber-optic management features 10 and a second heat sink in the form of a heat sink region 12. The fiber-optic management features include, for example, optical fiber couplers, fiber splitters, structures on which excess replacement optical fiber may be wound (with controlled bend radii), and various features for protecting the optical fibers. Through these features, the module may satisfy dual-fiber radii requirements. Through apertures 20, fiber is passed between the top-mounting surface of the module to connect with the back surface of the fiber-optic management features.

The heat sink region includes a collection of cooling fins 25 which extend from a base 21 attached to the underside of the printed wiring board at a location opposite to where the optoelectronic components and electrical components are mounted. The cooling fins preferably extend along the entire back surface of the module, except in the area where the fiber-optic management features are located. This allows the cooling fins to maximize the removal heat from virtually all the areas of the printed wiring board where the heat-generating devices are located. The base of the cooling fins and the heat sink surface 2 mentioned above are preferably bonded to the printed wiring board using an adhesive with a high heat conductance. Those skilled in the art may appreciate that other adhesives or attachment devices may also be used for this purpose.

If desired, the cooling fins may be have dimensions much smaller than the fiber mounting surface of the module. For example, if opto-electronic components are mounted to only one localized region on the front surface of the module, the fins may occupy an area on the back surface which corresponds to the location and dimensions of that localized region. The cooling fins and the heat sink surface may be integrally formed, or they may be attached to one another by conventional means, e.g., adhesives. Together, the heat sink surface and the cooling fins remove heat from both the individual opto-electronic and electrical components of the module and from the printed wiring board. Heat removal occurs as a result of conduction of heat through the printed wiring board. In addition, or alternatively, and for high-heat generating elements especially, apertures may be cut into the printed wiring board to allow direct contact to exist between those elements and the heat sink.

The cooling fins are a particularly advantageous feature of the invention because their geometry allows them to dissipate heat from the module at a very rapid rate. As a result, a high packaging density of optical fibers, opto-electronic and electrical components may be realized on the board without fear of the module malfunctioning because of adverse thermal influences. Also, because both the heat sink surface and cooling fins have a low profile and are integrated onto the wiring board in a space-efficient manner (i.e., the heat sink surface is preferably even with the surface of the printed circuit board so as to effectively create one smooth front surface of the module), additional heat may be removed by air convection directly across the front surface, i.e., as a result of circulating air removing heat directly from the board and the heat-generating components thereon and without thermal interference from the heat sink. Through the heat sink surface and cooling fins of the present invention, therefore, heat conduction and heat convection can exist simultaneously to provide an efficient and highly effective cooling arrangement.

Another advantage of the module of the present invention is that it integrates heat sink features, with fiber-optic management features. In particular, for example, a single casting may be made for housing the fiber optic management features, and the heat sink. This further increases the packaging density of the module, which, in turn, translates into greater system functionality per unit volume. This may be attributable to the fiber being kept within the volume that conventional systems have provided to the heat sink. However, unlike conventional systems, thermal performance has not been compromised because the highest power dissipating components of the module may be placed directly over the cooling fins. As a result, the fins provide efficient heat transfer to the system's cooling air which circulates over the module surfaces.

The optical module of the present invention may have a number of alternative configurations. For example, if desired, the heat sink surface 2 may be removed. Under these circumstances, only the cooling fins extending from the base would remain to remove heat from the components on the printed wiring board. Also, depending upon the fiber-optics required, the region reserved for mounting electrical components may be expanded into other areas of the printed wiring board, or integrated with the opto-electronic components on the fiber-mounting region of the board.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. An optical module, comprising:
   a printed wiring board having a front surface and a back surface, said front surface forming a platform onto which at least one opto-electronic device is mounted; and
   a heat sink attached to the back surface of said printed wiring board, said heat sink including a plurality of fins which dissipate heat generated from said at least one opto-electronic device.

2. The optical module of claim 1, further comprising:
   at least one fiber-optic management device formed on the back surface of said printed wiring board.

3. The optical module of claim 2, wherein said plurality of fins are located adjacent said at least one fiber-optic management device.

4. The optical module of claim 1, wherein said plurality of fins cover an area on the back surface of said printed wiring board which is thermally coupled to said at least one opto-electronic device.

5. The optical module of claim 1, wherein said heat sink is attached to said back surface of said printed wiring board by an adhesive.

6. The optical module of claim 2, further comprising:
   a heat sink surface is mounted adjacent said front surface of said printed wiring board.

7. The optical module of claim 6, wherein said heat sink surface is substantially even with said front surface of said printed wiring board.

8. The optical module of claim 6, wherein said heat sink and said heat sink surface are formed as a single integral piece.

9. The optical module of claim 6, where said heat sink is attached to said heat sink surface.

10. The optical module of claim 6 wherein said heat sink, said heat sink surface and said fiber-optic management device are formed as a single integral piece.

11. An optical module, comprising:

a mounting plane for holding at least one opto-electronic device; and a plurality of cooling fins attached to a back surface of the mounting plane which are thermally coupled to said at least one opto-electronic device.

12. The optical module of claim 11, further comprising:

a fiber-optic management element mounted on said mounting plane.

13. The optical module of claim 12, wherein said fiber-optic management element is mounted on said back surface of the mounting plane adjacent said cooling fins.

14. The optical module of claim 11, further comprising:

a heat sink surface mounted adjacent a surface of said mounting plane on which said at least one opto-electronic device is mounted.

15. The optical module of claim 14, wherein said heat sink surface is substantially even with said surface of said mounting plane.

16. The optical module, comprising:

a heat sink;

at least one fiber-optic management device located at a first region of the heat sink; and a mounting plane on a second region of the heat sink, said mounting plane having a front surface containing at least one opto-electronic device wherein said heat sink includes a plurality of cooling fins, said cooling fins attached to a back surface of said mounting plane.

17. The optical module of claim 16, wherein said cooling fins are thermally coupled to said at least one opto-electronic device on the front surface of said mounting plane.

18. The optical module of claim 16, further comprising: at least one electronic device mounted on said mounting plane.

19. The optical module of claim 16, wherein said heat sink further includes a heat sink surface mounted adjacent the front surface of said mounting plane.

20. The optical module of claim 19, wherein said heat sink has a one-piece construction which includes said cooling fins and said heat sink surface.

* * * * *